Aug. 3, 1937.  S. B. LINDLEY  2,088,657

EXTRACTING MACHINE

Filed Dec. 29, 1934   2 Sheets-Sheet 1

INVENTOR.
STACEY B. LINDLEY.
BY Lockwood Goldsmith & Galt
ATTORNEYS.

Aug. 3, 1937. S. B. LINDLEY 2,088,657
EXTRACTING MACHINE
Filed Dec. 29, 1934 2 Sheets-Sheet 2
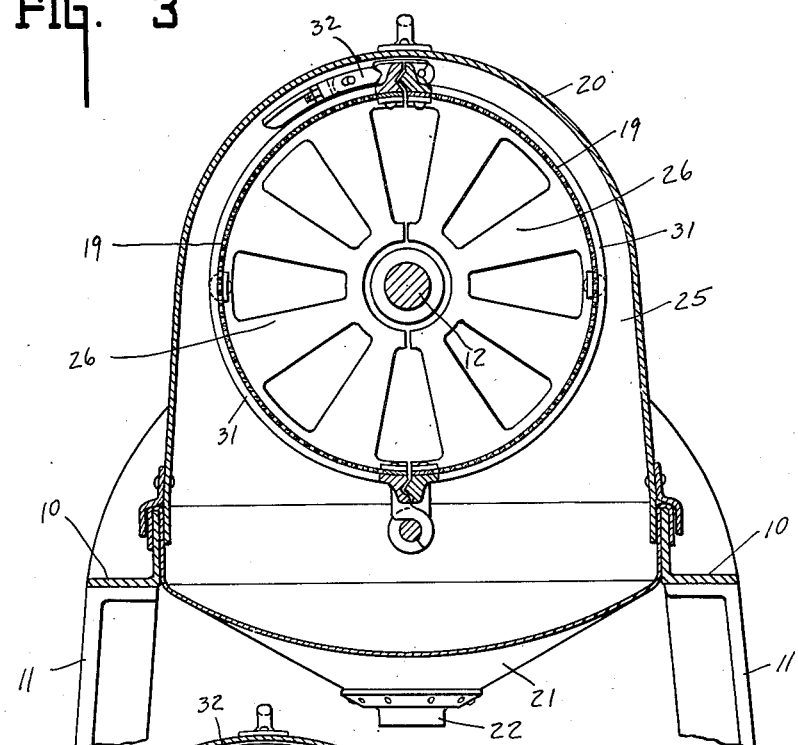
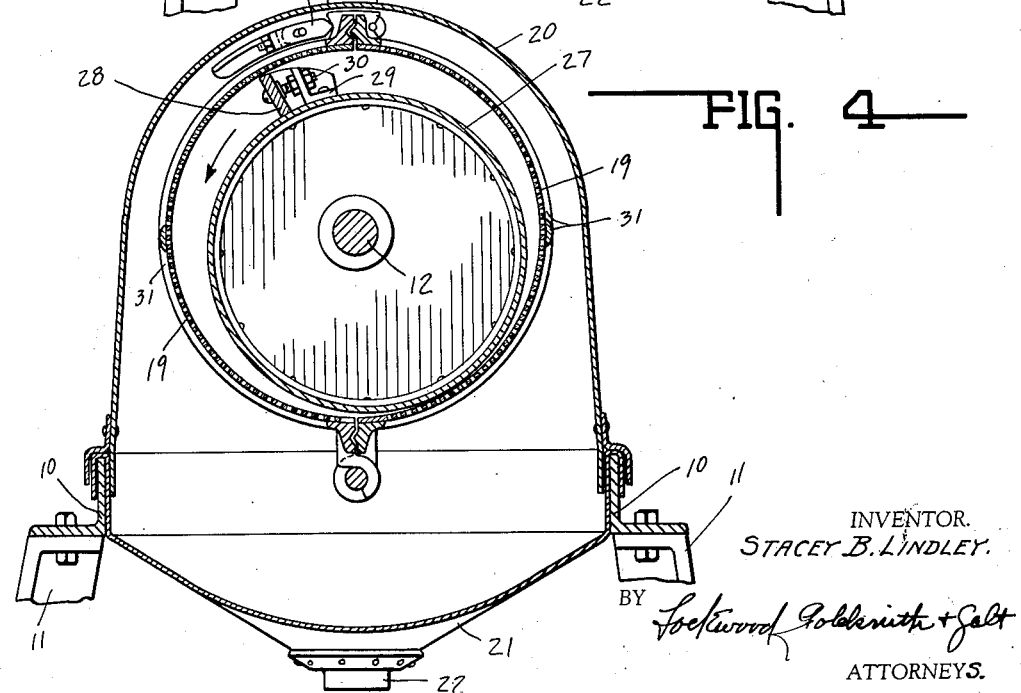
INVENTOR.
STACEY B. LINDLEY.
BY
ATTORNEYS.

Patented Aug. 3, 1937

2,088,657

UNITED STATES PATENT OFFICE 2,088,657

EXTRACTING MACHINE

Stacey B. Lindley, Indianapolis, Ind., assignor to Indiana Canning Machinery Company, Indianapolis, Ind., a corporation Application December 29, 1934, Serial No. 759,707

5 Claims. (Cl. 100—47)

This invention relates to a machine for extracting a substance such as juice from tomatoes or a like edible material, particularly wherein the juice is desired for use as a beverage, but where variations are also applicable to the production of chili sauce and various grades of vegetable or fruit substances.

The principal object of the invention resides in a machine of this character which will feed to the extracting screen the proper amount or quantity of tomatoes or like materials irrespective of the amount thereof contained in the feeding hopper, coupled with the action of the feed for causing the material to be broken open and reduced to smaller sections preparatory to the crushing and squeezing action.

Another feature of the invention resides in the employment of an eccentric pressing drum rotating eccentrically in the cylindrical screen to crush and squeeze the material while moving the pomace to be discharged therefrom, the juice or substance passing through the screen, depending upon the mesh.

Figure 1:
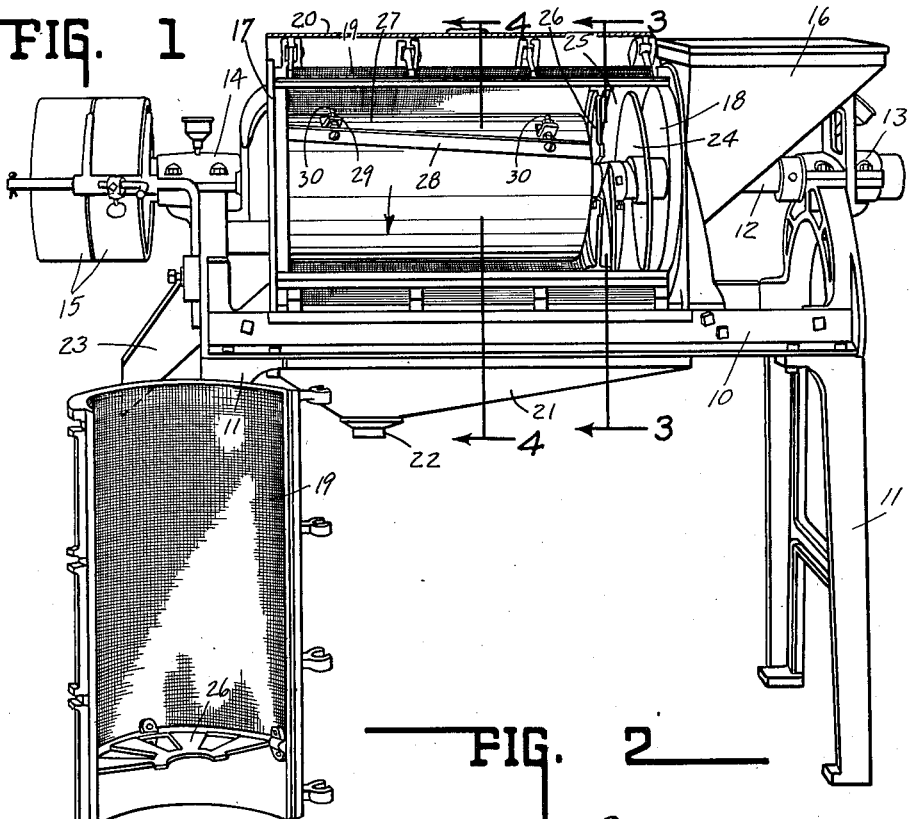
Figure 2:
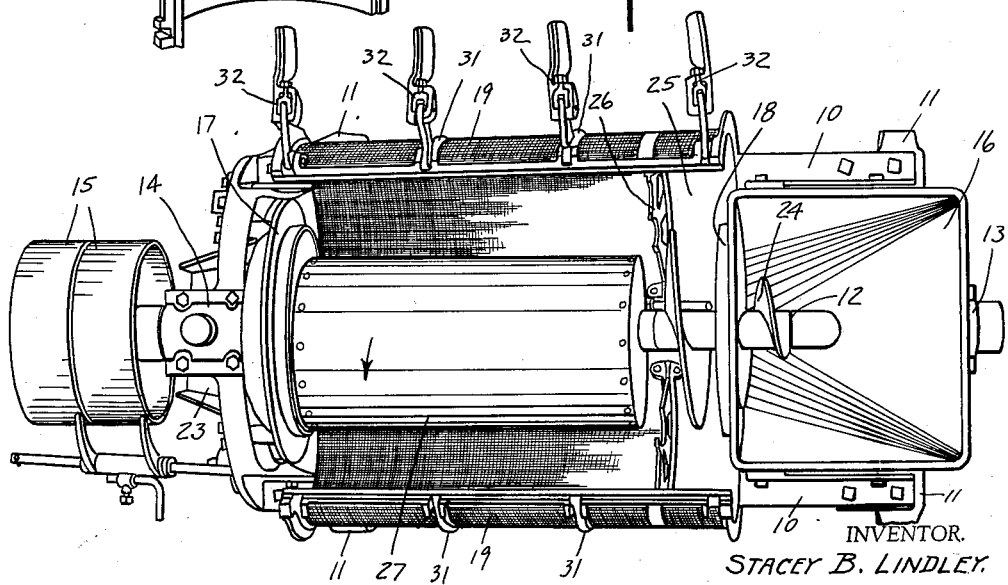

Further objects and features of the invention will be understood from the accompanying drawings and the following description and claims:

Fig. 1 is a perspective view of the machine with the cover and a side section of the screen removed. Fig. 2 is a perspective view looking down upon the machine with the cover removed and the screen in open position. Fig. 3 is a central vertical section through the machine taken as indicated by the line 3—3 of Fig. 1. Fig. 4 is a central vertical section through the machine as indicated by the line 4—4 of Fig. 1.

In the drawings there is illustrated an extracting machine comprising a bed frame 10 mounted upon supporting legs 11. Extending horizontally and longitudinally of the bed plate there is a drive shaft 12 rotatably mounted in bearings 13 and 14. Adjacent the bearing 14 there is provided the usual drive pulleys 15 keyed to said shaft, whereby the said shaft may be driven by any suitable source of power. Adjacent the opposite end there is the usual hopper 16 for receiving a quantity of edible material in its natural state, such as tomatoes and the like, to be treated.

Intermediate the hopper 16 and bearing 14, there are a pair of end plates 17 and 18 about which a cylindrical screen 19 is removably mounted in sections so as to provide a cylindrical perforated enclosure. A suitable cover 20 is removably mounted about the screen to seat upon the bed plate 10 below which there is provided a sump 21 with a discharge opening 22 to receive the juice or substance passed through the screen 19. At the intake of the machine the plate 18 is provided with a central opening surrounding the shaft 12, through which the material is fed, as hereinafter described. At the opposite or discharge end of the plate 17 there is provided an opening communicating with a discharge trough 23 for the pomace or residue after the substance is extracted.

At the intake end of the machine, the shaft 12 is provided with a feed screw 24 having its spiral increasing in radius in the direction of the feed, that portion of the screw rotating within the plane of the plate 18 approaching the diameter of the opening in said plate for feeding the material therethrough into a compartment 25. That portion of the feed screw within said compartment increases further to maximum radius terminating adjacent an apertured partition 26. Irrespective of the quantity of tomatoes or material in its normal state contained within the hopper, a limited amount may be fed to the compartment 25 as governed by the radius of the spiral at that part of the screw spaced a single pitch from the opening in the plate 18. The material fed thereby to the compartment 25 will be pressed between the blade at its maximum radius and the apertured partition 26 through which the material will be forced. In passing through the openings in the partition 26, the material will be cut or broken into jagged pieces, making the following operation possible, whereas whole tomatoes or the like could not be successfully processed thereby.

Within the processing chamber between the partition 26 and end plate 17, a smooth surfaced cylindrical drum 27 is eccentrically mounted upon the shaft 12 to be rotated thereby. The cylindrical screen 19 is concentric with the shaft, whereby the drum will operate eccentrically with respect to the surface thereof. The drum is of such diameter relative to the screen that one element of its periphery will approach to within approximately one-sixteenth of an inch from the screen whereas the opposite side thereof will be spaced approximately two inches therefrom. Extending longitudinally of the drum and secured along that portion of its periphery which is the farthest from the screen, there is provided a feed blade 28. Said blade is adapted to normally extend at an angle to the axial plane therethrough but may be adjusted to any desired angle, depending upon the character of the substance extracted. To this end a pair of lugs 29 are secured to the surface of the drum to which the blade 28 is secured in adjustable spaced relation by bolts 30. As best shown in Fig. 1, the blade 28 is farther advanced at the receiving end of the drum than at the discharge end. This position of the blade serves to prevent the entrance of uncrushed pieces of material to the space ahead of the blade, in which space they would tend to be discharged with the pomace without being squeezed between the drum and the screen.

For extracting a substance such as juice as commonly employed for beverage purposes, the screen 19 is provided with very small perforations and is reinforced by peripheral and longitudinal bands 31. The screen is formed with two side sections which are removable and secured in closed position by adjustable locks 32, the screen extending throughout both the processing compartment and feed compartment 25, with the partition 26 formed in corresponding sections. Wherein it is desired to extract a heavier or larger proportion of the substance than the mere juice, the screen is provided with larger perforations and preferably does not extend beyond the partition 26, the perforations in the screen being omitted in that portion surrounding the compartment 25. The percentage of juice or substance extracted may also be varied by the pitch of the blade 28, a greater pitch carrying away the pomace more rapidly so as to reduce the amount of extracted substance and thereby obtain a finer quality, or it may be adjusted to a smaller pitch approaching the axial plane of the drum so that the pomace will not be so rapidly carried away, resulting in a larger portion of extraction therefrom.

In operation, the machine as illustrated herein, when used for the purpose of extracting juice, may be operated at a speed of about 175 R. P. M. The tomatoes or the like with which the hopper 16 is fed will be gradually fed into the compartment 25 and forced through the partition 26 to be received in the processing compartment in the space between the screen and the drum, the material being broken up into small pieces by its passage through the partition 26. As the drum rotates, that portion closely approaching the screen will compress the material and squeeze it under tremendous pressure against the perforated screen, emitting the juice or substance, as the case may be, and the pomace or hard particles, such as the core, skin, seed and the like, as well as any substance which cannot pass through the screen, depending upon the size of its perforations, will escape by reason of the slight space remaining between the drum and screen at its closest approach, but will be picked up by the feed blade 28 and moved longitudinally of the machine to be ultimately discharged through the spout 23.

The invention claimed is:

1. A machine for extracting substance from an edible material comprising a cylindrical screen, a pressing drum rotatably mounted within said screen, said drum being eccentric thereto and having its axis of rotation concentric therewith, means for rotating said drum within the screen in close relation thereto, an apertured partition mounted adjacent the feeding end of said screen and spaced from the adjacent end wall of the machine to provide a compartment into which the material is fed, and a feed screw extending through the end wall with its spiral increasing in radius as it approaches said partition whereby the material fed into said compartment by said screw will be forced by the end of the spiral through the apertures of said partition into said screw broken up into small pieces.

2. A machine for extracting substance from an edible material comprising a cylindrical screen, a cylindrical drum rotatably mounted within said screen, said drum being eccentric with the screen and having its axis of rotation concentric therewith, means for rotating said drum within the screen in close relation thereto whereby one element of the drum surface will more closely approach the screen than any other element thereof, a feed blade extending substantially longitudinally of the drum on the portion thereof spaced from the screen and at an angle to its axial plane for engaging and discharging the residue of the material through the discharge end of the machine, said blade being farther advanced at the receiving end than at the discharge end of said drum, and means for feeding said material to the interior of the screen through the intake end of the machine to be engaged and pressed between the closely approaching inner and outer surfaces of the screen and drum, respectively as the latter moves thereabout.

3. A machine for extracting substance from an edible material, comprising a cylindrical screen, means operable in said screen for forcing the substance therethrough and carrying the residue therefrom, a hopper for containing a batch of material mounted adjacent the intake end of the machine spaced therefrom by an end plate having an opening therein, a feed screw extending through the opening in said plate into said hopper provided with a spiral increasing in radius from the hopper through said opening to the interior of the machine, means for driving said feed screw at a predetermined speed, an apertured partition mounted in said screen spaced from said end plate to provide a compartment therebetween adjacent which the inner end of said spiral of maximum radius terminates, and means for driving said feed screw at a predetermined speed.

4. A machine for extracting substance from an edible material comprising a cylindrical body having the greater portion thereof comprising a screen, a pressing drum rotatably mounted within said body, said drum being eccentric thereto and having its axis of rotation concentric therewith, a shaft extending axially through said body for driving said drum, end plates mounted at the ends thereof through which said shaft is adapted to pass, one of said end plates being provided with a discharge opening and the other with a centrally disposed intake opening, a feed blade mounted on the periphery of said drum to extend longitudinally thereof at an angle to a plane through its axis, means for adjusting the angular position of said blade for directing the residue of said material through said discharge opening, an apertured partition mounted adjacent the end of said drum and spaced from the end plate at the intake end of the machine, a hopper mounted on the other side of said last mentioned end plate, and a screw feed mounted on said shaft and rotatable therewith extending from said hopper into said compartment through the opening in said last mentioned end plate, said screw feed having a spiral increasing in radius from the hopper to said partition and terminating adjacent said partition with its radius substantially that of said screen, whereby said material will be conducted at a predetermined rate of feed from the hopper by said screw into said compartment and forced through the apertures of said partition in a broken up condition to be pressed by said drum.

5. A machine for extracting substance from an edible material comprising a screen, a pressing member rotatably mounted within said screen, means for rotating said member within the screen in pressing relation thereto, an apertured partition mounted adjacent the feeding end of said screen and spaced from the adjacent end wall of the machine to provide a compartment into which the material is fed, and a feed screw extending through the end wall with its spiral increasing in radius as it approaches said partition, whereby the material fed into said compartment by said screw will be forced by the end of the spiral through the apertures of said partition into said screen broken up into small pieces.

STACEY B. LINDLEY.